US007864048B1

(12) United States Patent
Cope et al.

(10) Patent No.: US 7,864,048 B1

(45) Date of Patent: Jan. 4, 2011

(54) DEVICE LOCATION TRANSITION AWARENESS IN A WIRELESS MODEM

(75) Inventors: Warren B. Cope, Olathe, KS (US); Douglas R. Green, Lenexa, KS (US)

(73) Assignee: Sprint Communications Company L.P., Overland Park, KS (US)

(*) Notice: Subject to any disclaimer, the term of this patent is extended or adjusted under 35 U.S.C. 154(b) by 406 days.

(21) Appl. No.: 11/862,768

(22) Filed: Sep. 27, 2007

(51) Int. Cl.
*G08B 13/14* (2006.01)

(52) U.S. Cl. ............. 340/568.1; 340/539.1; 340/539.13

(58) Field of Classification Search ............. 340/568.1, 340/539.1, 539.13
See application file for complete search history.

(56) References Cited

U.S. PATENT DOCUMENTS 5,962,949 A 10/1999 Dhuler et al.
6,678,357 B2 * 1/2004 Stumer et al. ................ 379/45
6,707,888 B1 * 3/2004 Cope .......................... 379/45
6,927,727 B2 * 8/2005 Cleghorn ............... 342/357.07
6,956,931 B1 * 10/2005 Cope .......................... 379/45
7,091,851 B2 8/2006 Mason et al.
7,091,852 B2 * 8/2006 Mason et al. .......... 340/539.13
7,113,091 B2 9/2006 Script et al.
7,129,842 B2 10/2006 Hope
7,263,379 B1 * 8/2007 Parkulo et al. ......... 340/539.13
7,366,157 B1 * 4/2008 Valentine et al. ............ 370/352
7,388,490 B2 * 6/2008 Freitag et al. ............ 340/572.1
7,629,882 B2 * 12/2009 Farah et al. ............ 340/539.13
7,639,792 B2 * 12/2009 Qiu et al. ............... 379/207.15
7,664,106 B2 * 2/2010 Croak et al. ................ 370/389
2003/0063714 A1 * 4/2003 Stumer et al. ................. 379/37
2005/0153681 A1 * 7/2005 Hanson .................. 455/404.2
2005/0190892 A1 * 9/2005 Dawson et al. ................ 379/37
2005/0198271 A1 * 9/2005 Rubinstein .................. 709/224
2005/0232164 A1 * 10/2005 Anzarouth et al. .......... 370/255
2006/0281437 A1 * 12/2006 Cook ...................... 455/404.2
2007/0030841 A1 * 2/2007 Lee et al. .................... 370/352
2007/0153715 A1 * 7/2007 Covington et al. .......... 370/315
2007/0201433 A1 * 8/2007 Croak et al. ................ 370/352
2008/0037715 A1 * 2/2008 Prozeniuk et al. ............. 379/45
2009/0003312 A1 * 1/2009 Velazquez et al. ........... 370/352
2010/0079277 A1 * 4/2010 Farah et al. ............ 340/539.13

* cited by examiner

*Primary Examiner*—Eric M Blount

(57) ABSTRACT

A method is provided in a communication system for determining a relative position change of a wireless modem. The first location of the wireless modem is determined, and then the wireless modem reports the first location to a service node. A dead reckoning device within the wireless modem then determines a second location of the wireless modem. If the second location is greater than a predetermined distance from the first location, then the wireless modem reports the second location to the service node.

14 Claims, 5 Drawing Sheets

210 DETERMINE FIRST LOCATION OF WIRELESS MODEM
220 REPORT FIRST LOCATION TO SERVICE NODE
225 WIRELESS MODEM MOVES TO SECOND LOCATION
230 DETERMINE SECOND LOCATION OF WIRELESS MODEM UTILIZING DEAD RECKONING DEVICE
240 SECOND LOCATION GREATER THAN PREDETERMINED DISTANCE FROM FIRST LOCATION?
N
Y
250 REPORT SECOND LOCATION TO SERVICE NODE

DEVICE LOCATION TRANSITION AWARENESS IN A WIRELESS MODEM

TECHNICAL FIELD

The invention is related to the field of communications, and in particular, to a communication system for determining a relative position change of a wireless modem.

TECHNICAL BACKGROUND

In the past, 9-1-1 emergency services (911) determined the home address of a caller based on the caller's home telephone number. Today, mobile telephones provide their current latitude and longitude coordinates in the event of a 911 call through either a Global Positioning System (GPS) chip or triangulation between cell towers. However, a growing trend is users who rely on in-home modems with voice capabilities (often Voice-over Internet Protocol or VoIP) for their voice communications instead of, or in addition to, traditional wireline telephones, wireless telephones, and mobile telephones.

Issues arise when a caller dials 911 using a modem with VoIP service because a VoIP adapter can be plugged into any broadband internet connection. As a result, the caller could actually be hundreds or even thousands of miles away from their home address. However, the 911 call goes to an answering point associated with the caller's home address and not the caller's actual location. Even if a GPS receiver is installed in the VoIP modem, it will likely be indoors and unable to get a signal. Presently, 911 callers using a modem with VoIP service must verbally verify their location when summoning assistance in an emergency.

TECHNICAL SUMMARY

Generally described, a system is provided that determines the relative position change of a wireless modem. The wireless modem is configured to report its first location to a service node. A dead reckoning device within the wireless modem is configured to determine a second location of the wireless modem. If the second location is greater than a predetermined distance from the first location, then the wireless modem is configured to report the second location to the service node.

In another embodiment, a method is provided that determines the relative position change of a wireless modem. A first location of the wireless modem is determined and reported to a service node. Using a dead reckoning device, the wireless modem determines a second location for the wireless modem. The second location for the wireless modem is reported to the service node if the second location is greater than a predetermined distance from the first location.

DETAILED DESCRIPTION

Figure 1:
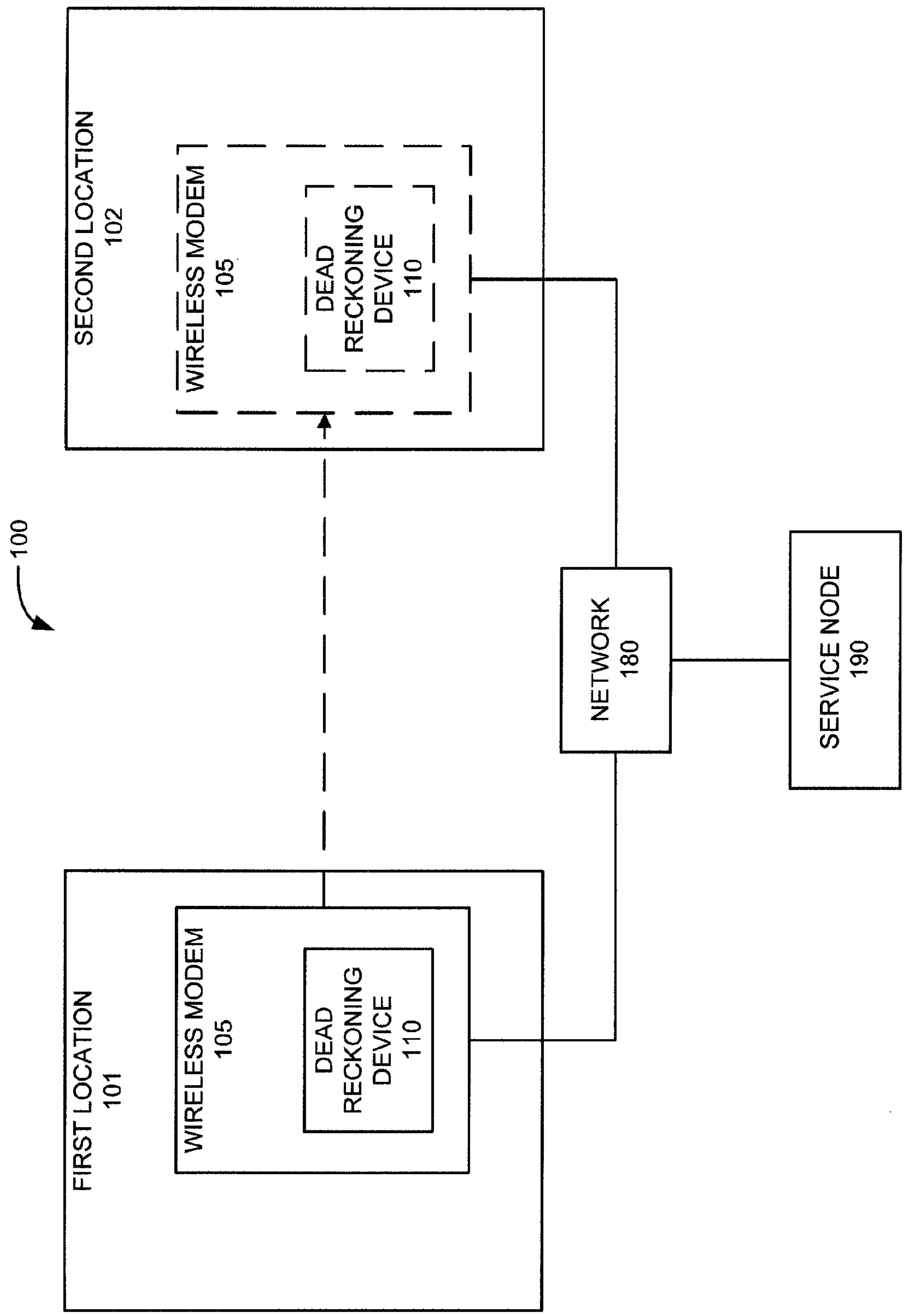
FIG. 1 is a block diagram illustrating a communication system for determining a relative position change of a wireless modem.

Referring to FIG. 1, communication system 100 comprises wireless modem 105, network 180, service node 190, first location 101, and second location 102. Wireless modem 105 comprises dead reckoning device 110. Wireless modem 105 exchanges information with service node 190 via network 180.

Wireless modem 105 comprises any unit that has wireless communication capabilities performing wireless receive and transmit functions. Wireless modem 105 may include broadband modems, routers, adapters, and the like that provide a gateway function between a wireless network and a computing device such as a personal computer. Wireless modem 105 could transmit and receive utilizing any number of wireless technologies including, but not limited to, Code Division Multiple Access (CDMA) 1xRTT, Global System for Mobile communications (GSM), High-Speed Packet Access (HSPA), Evolution-Data Optimized (EV-DO), EV-DO rev. A, Worldwide Interoperability for Microwave Access (WiMAX), and the like. Further, wireless modem 105 may include the ability to transmit and receive over a single wireless protocol or multiple wireless protocols and have the ability to simultaneously utilize multiple protocols.

Dead reckoning device 110 comprises a Micro-Electro Mechanical Systems (MEMS) inertial sensor, an accelerometer, a gyroscope, or any dead reckoning technology capable of operating as described herein.

Network 180 comprises any type of communication network that would allow wireless modem 105 to exchange information with service node 190. Network 180 could be any packet-based network or packet switching system where packets are routed over data links shared with other traffic. Characteristics of packet-based networks include optimizing channel capacity available in a network, minimizing transmission latency and increasing robustness of communication. For example, network 180 could include many of the public switched data networks (PSDNs) such as the internet protocol network (Internet), Frame Relay, Asynchronous Transfer Mode (ATM), General Packet Radio Service (GPRS), Ethernet, and others.

Service node 190 comprises any computer system configured with software that functions as described herein that has the ability to exchange information via network 180 with wireless modem 105. Service node 190 could be comprised of a programmed general-purpose computer, although those skilled in the art will appreciate that programmable or special purpose circuitry and equipment may be used. Service node 190 may also be distributed among multiples platforms or devices.

Service node 190 could comprise any location-based service. Some examples of a location-based service are emergency services, package tracking, retail marketing, cable services, weather reports, traffic reports, navigation, mapping, security services, business directories, or any public or private location-based service provider.

First location 101 and second location 102 are physical locations identifiable by street address, Global Positioning System (GPS) coordinates, latitude and longitude coordinates (lat/long), or any other method of physical location identification.

Figure 2:
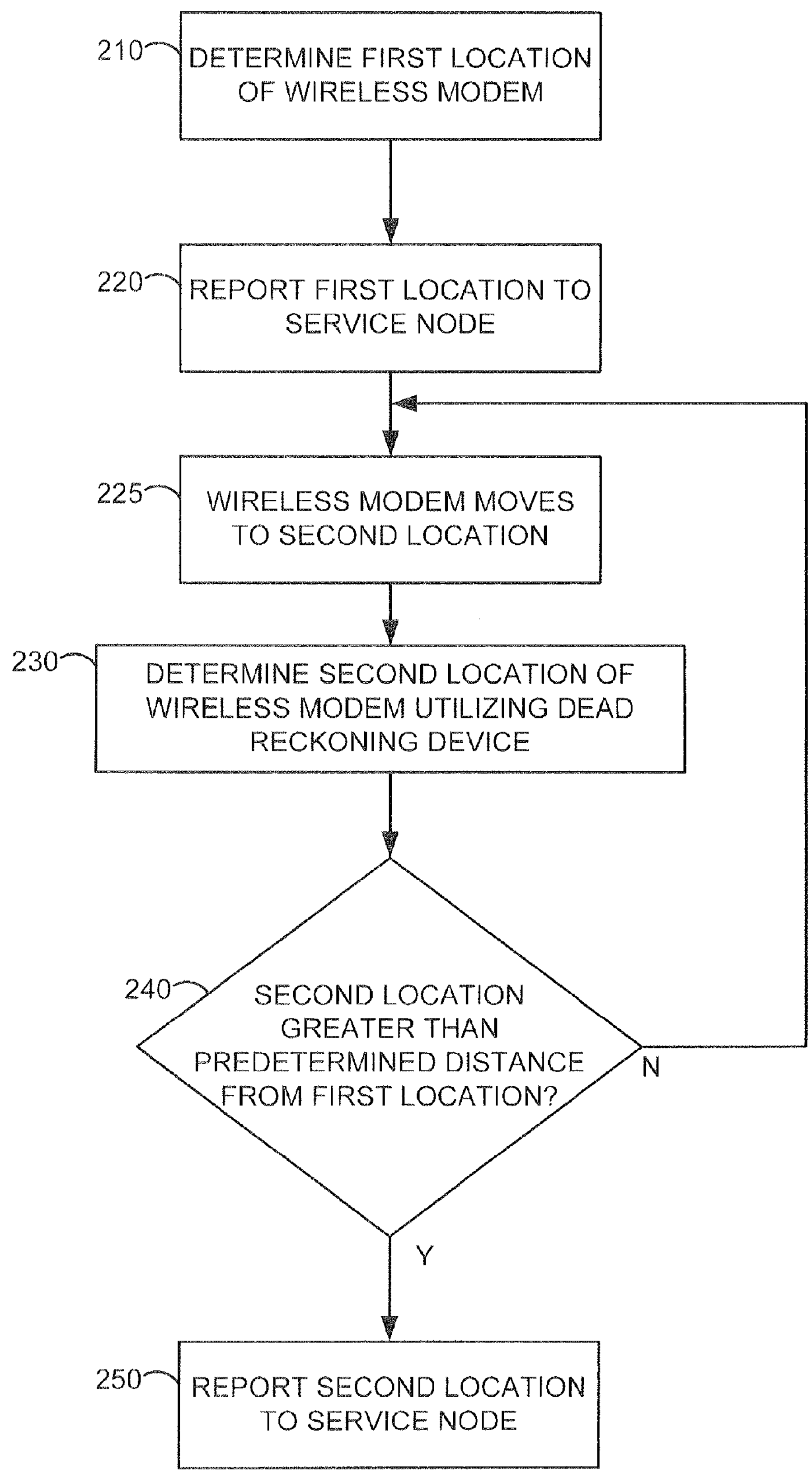
FIG. 2 is a flow diagram illustrating a method for determining a relative position change of a wireless modem.

In operation, as illustrated in FIG. 2, communication system 100 determines first location 101 of wireless modem 105 (210). Communication system 100 then reports first location

101 to service node 190 via network 180 (220). Wireless modem 105 moves (as shown by the dashed lines in FIG. 1) to second location 102 (225). Dead reckoning device 110 then detects wireless modem's 105 change in position and determines second location 102 of wireless modem 105 (230). If second location 102 is greater than a predetermined distance from first location 101 (240), then communication system 100 reports second location 102 to service node 190 via network 180 (250).

Figure 3:
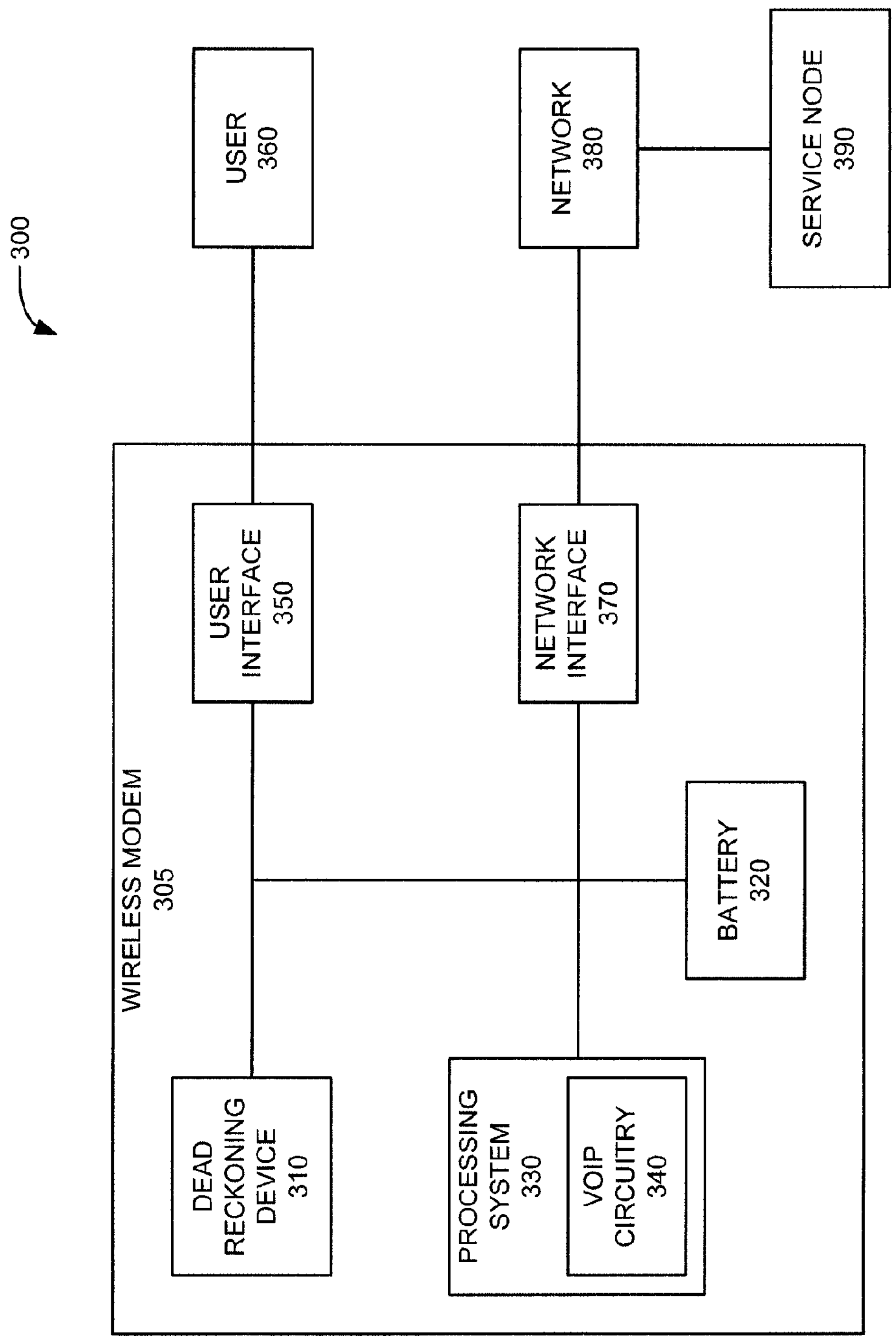
FIG. 3 is a block diagram illustrating an embodiment of a communication system for determining a relative position change of a wireless modem.

FIG. 3 illustrates an embodiment of communication system 300. Communication system 300 comprises wireless modem 305, user 360, network 380, and service node 390. Wireless modem 305 comprises dead reckoning device 310, battery 320, processing system 330, user interface 350, and network interface 370. Processing system 330 comprises VoIP circuitry 340. Dead reckoning device 310, battery 320, processing system 330, user interface 350, and network interface 370 are linked within wireless modem 305. User interface 350 is configured to communicate with user 360 and network interface 370 exchanges information with service node 390 via network 380.

Dead reckoning device 310 comprises a MEMS accelerometer. The MEMS dead reckoning technology provides location delta information that can be used to determine if wireless modem 305 is in motion or has changed position. When a change of location has been detected, the MEMS can determine the positional displacement from the last known location. Positional displacement may comprise distance and direction, GPS coordinates, lat/long coordinates, or any physical location identifier.

Processing system 330 comprises a computer microprocessor, logic circuit, or some other processing device. Processing system 330 may be distributed among multiple processing devices. VoIP circuitry 340 comprises coder-decoders (codecs), Subscriber Line Interface Circuit (SLIC), echo cancellers, or any technology capable of voice communication. User interface 350 comprises a keyboard, mouse, voice recognition interface, microphone and speakers, graphical display, touch screen, or some other type of user device. User interface 350 may be distributed among multiple user devices. Network interface 370 comprises a network interface, modem, port, transceiver, or some other communication device and is preferably a WiMAX transceiver configured to receive wireless packet messages from network 380. Network interface 370 may be distributed among multiple communication devices. Battery 320 comprises a power cell or any other type of power supply internal to wireless modem 305.

User 360 comprises anyone using wireless modem 305 for communication or data transmission.

Network 380 comprises a packet communication network that allows network interface 370 to exchange information with service node 390. Network 380 comprises a radio access network and a core packet network. Preferably, the radio access network would be a WiMAX network and the core packet network would be the Internet.

Service node 390 could be comprised of any general-purpose computer with conventional communication equipment. Preferably, service node 390 is operated by a location-based service provider such as a 911 emergency services Public Safety Answering Point (PSAP).

Figure 4:
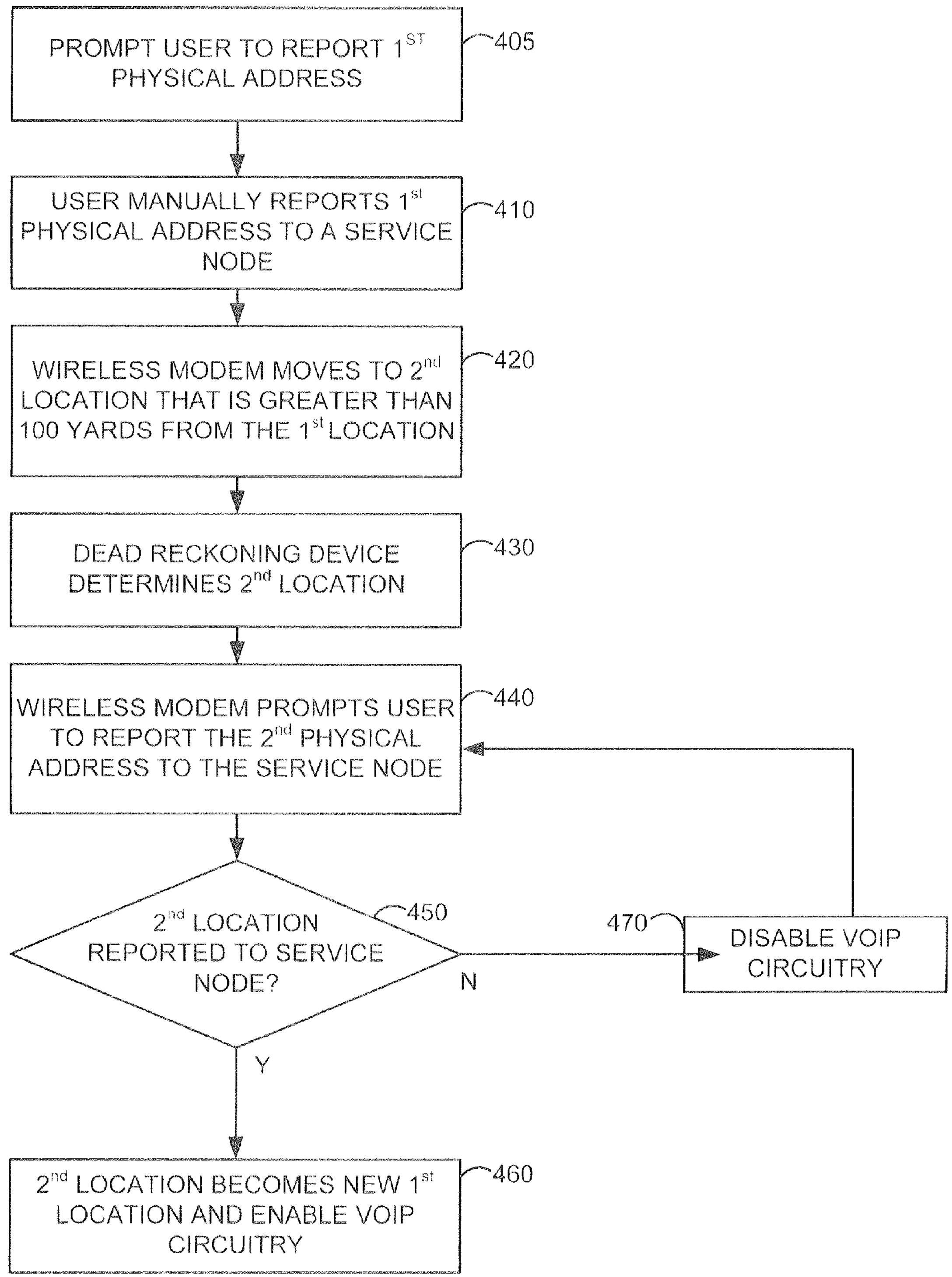
FIG. 4 is a flow diagram illustrating a method for reporting a relative position change of a wireless modem.

FIG. 4 illustrates the operation of an embodiment of communication system 300. When wireless modem 305 is powered-on, user interface 350 prompts user 360 to report a first physical address of wireless modem 305 to service node 390 (405). User 360 manually reports the first physical address of wireless modem 305 to service node 390 via network 380 using wireless modem 305, user interface 350, and network interface 370 (410). Wireless modem 305 then moves to a second location that is greater than 100 yards away from the first physical address (420). While wireless modem 305 is in transit, dead reckoning device 310 continues to receive power from battery 320. Dead reckoning device 310 detects the change in location of wireless modem 305 and determines the second location of wireless modem 305 (430).

When wireless modem 305 is powered-on after moving from the first location to the second location, user interface 350 prompts user 360 to report a second physical address of wireless modem 305 to service node 390 (440). User 360 manually reports the second physical address of wireless modem 305 to service node 390 via network 380 using wireless modem 305, user interface 350, and network interface 370.

Wireless modem 305 then checks to determine whether the second physical address was reported to service node 390 (450). If the second physical address was reported to service node 390, then the second physical address becomes the new first physical address and processing system 330 enables VoIP circuitry 340 (460). If the second physical address was not reported to service node 390, then processing system 330 disables VoIP circuitry (470) and user interface 350 prompts user 360 to report the second physical address of wireless modem 305 to service node 390 (440).

Figure 5:
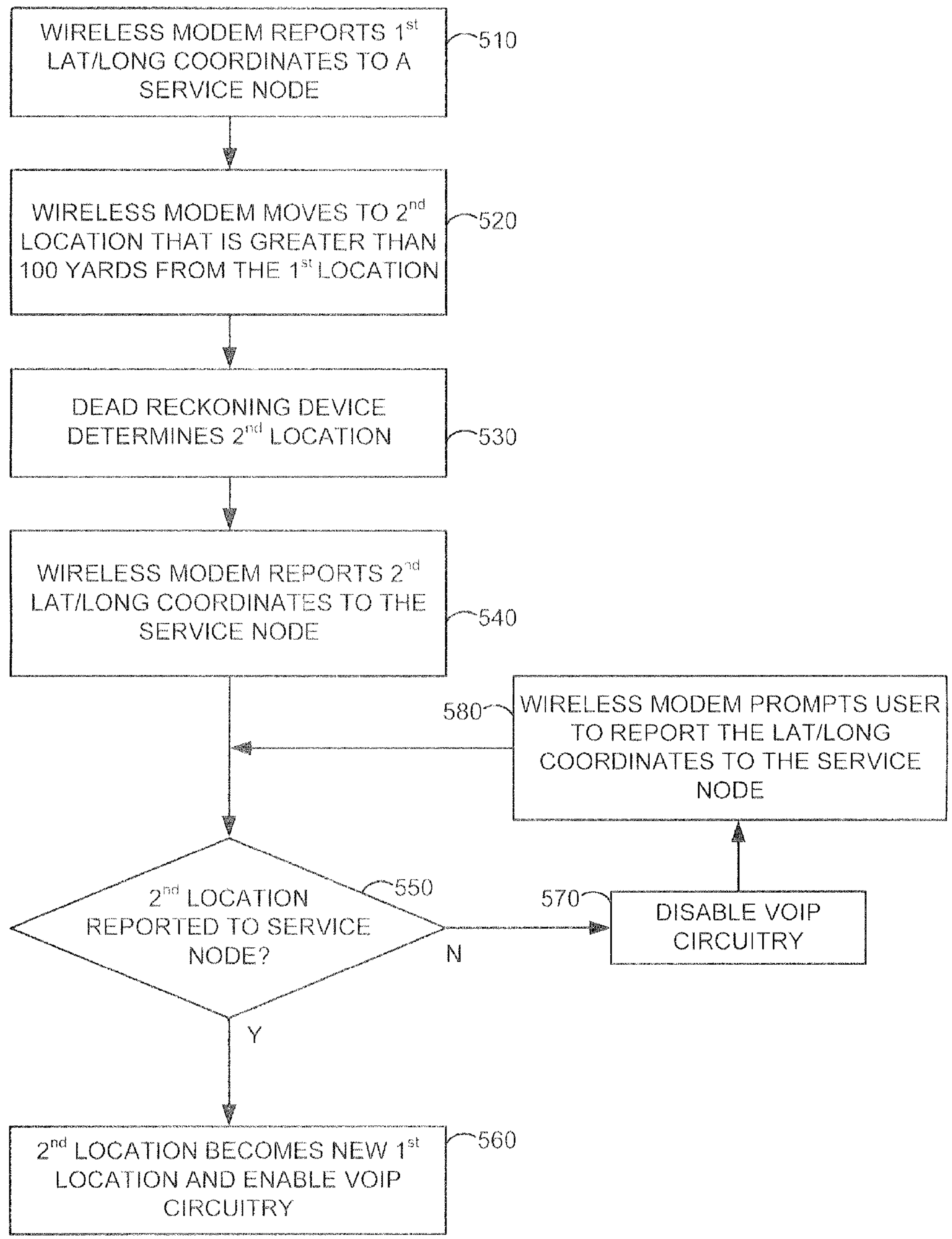
FIG. 5 is a flow diagram illustrating a method for reporting a relative position change of a wireless modem.

FIG. 5 illustrates the operation of another embodiment of communication system 300. When wireless modem 305 is powered-on, wireless modem 305 automatically reports a first set of latitude and longitude coordinates (lat/long) of wireless modem 305 to service node 390 via network 380 using network interface 370 (510). Wireless modem 305 then moves to a second location that is greater than 100 yards away from the first lat/long (520). While wireless modem 305 is in transit, dead reckoning device 310 continues to receive power from battery 320. Dead reckoning device 310 detects the change in location of wireless modem 305 and determines the second location of wireless modem 305 (530).

When wireless modem 305 is powered-on after the move, wireless modem 305 automatically reports a second lat/long of wireless modem 305 to service node 390 via network 380 using network interface 370 (540).

Wireless modem 305 then checks to determine whether the second lat/long was reported to service node 390 (550). If the second lat/long was reported to service node 390, then the second lat/long becomes the new first lat/long and processing system 330 enables VoIP circuitry 340 (560). If the second lat/long was not reported to service node 390, then processing system 330 disables VoIP circuitry (570) and user interface 350 prompts user 360 to report the second lat/long of wireless modem 305 to service node 390 (580).

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system comprising:

a service node;

a wireless modem configured to determine a first location of the wireless modem and report the first location of the wireless modem to the service node in response to the wireless modem entering an initial powered on state;

the wireless modem further comprising a dead reckoning device configured to receive power from a battery when the wireless modem enters a powered off state and determine a positional displacement of the wireless modem during transit from the first location while the wireless modem is in the powered off state;

in response to the wireless modem being moved further than a predetermined positional displacement from the first location and entering a subsequent powered on state, the wireless modem is configured to determine a second location of the wireless modem based on the positional displacement and report the second location to the service node;

wherein if the wireless modem successfully reports the second location to the service node, then the wireless modem is configured to enable voice over Internet protocol (VoIP) circuitry of the wireless modem, and wherein if the wireless modem fails to report the second location to the service node, then the wireless modem is configured to disable the VoIP circuitry and prompt a user of the wireless modem for a present location of the wireless modem.

2. The communication system of claim 1 wherein the dead reckoning device comprises Micro-Electro Mechanical Systems (MEMS) sensors.

3. The communication system of claim 1 wherein a user manually reports the first location in response to a prompt from the wireless modem.

4. The communication system of claim 1 wherein the wireless modem is configured to automatically report the first location.

5. The communication system of claim 1 wherein, in response to reporting the second location, the second location becomes the new first location.

6. The communication system of claim 1 wherein the service node comprises 911 Emergency Services.

7. The communication system of claim 1 wherein the predetermined positional displacement is greater than 100 yards.

8. A method for determining a relative position change of a wireless modem, the method comprising:

in response to the wireless modem entering an initial powered on state, determining a first location of the wireless modem and reporting the first location to a service node;

determining a positional displacement of the wireless modem during transit from the first location while the wireless modem is in a powered off state, wherein the positional displacement is determined utilizing a dead reckoning device configured to receive power from a battery when the wireless modem enters the powered off state;

in response to the wireless modem being moved further than a predetermined positional displacement from the first location and the wireless modem entering a subsequent powered on state, determining a second location of the wireless modem based on the positional displacement and reporting the second location to the service node;

wherein if reporting the second location to the service node is successful, then enabling voice over Internet protocol (VoIP) circuitry of the wireless modem, and wherein if reporting the second location to the service node fails, then disabling the VoIP circuitry and prompting a user of the wireless modem for a present location of the wireless modem.

9. The method of claim 8 wherein the dead reckoning device comprises Micro-Electro Mechanical Systems (MEMS) sensors.

10. The method of claim 8 wherein reporting the first location comprises a user manually reporting the first location in response to a prompt from the wireless modem.

11. The method of claim 8 wherein reporting the first location comprises the wireless modem automatically reporting the first location.

12. The method of claim 8 wherein, in response to reporting the second location, the second location becomes the new first location.

13. The method of claim 8 wherein the service node comprises 911 Emergency Services.

14. The method of claim 8 wherein the predetermined positional displacement is greater than 100 yards.

* * * * *